United States Patent [19]

Massey, Sr. et al.

[11] Patent Number: 4,611,820
[45] Date of Patent: Sep. 16, 1986

[54] WHEEL SUPPORT ASSEMBLY FOR A BOAT

[76] Inventors: Harold E. Massey, Sr., 5810 Hubbard La., Bartonville, Ill. 61607; Ronald L. Hamm, 910 Lehmann Bldg., Peoria, Ill. 61602

[21] Appl. No.: 661,567

[22] Filed: Oct. 16, 1984

[51] Int. Cl.$^4$ ............................................. B63C 13/00
[52] U.S. Cl. .................................. 280/414.2; 114/344; 280/43.18
[58] Field of Search ..................... 280/43, 43.17, 43.18, 280/43.19, 47.13 B, 47.2, 47.21, 47.22, 47.32, 414.1, 414.2, 414.3, 414.5, 491 B; 114/344

[56] References Cited

U.S. PATENT DOCUMENTS

| | | | |
|---|---|---|---|
| 2,890,466 | 6/1959 | Bly | 280/43 |
| 3,035,282 | 5/1962 | Bemis | 114/344 |
| 3,134,111 | 3/1964 | Atwood | 114/344 |
| 4,036,507 | 7/1977 | Henderson | 114/344 |
| 4,300,252 | 11/1981 | Montooth | 280/414.2 |
| 4,480,578 | 11/1984 | Fisher et al. | 114/344 |

FOREIGN PATENT DOCUMENTS 127772  5/1948  Australia ...................... 280/414.2

Primary Examiner—John J. Love
Assistant Examiner—Charles R. Watts
Attorney, Agent, or Firm—Huff & Hanson

[57] ABSTRACT

Disclosed is a wheel support assembly for a boat which is pivotally attached to the side of the boat such that the boat can be easily transported on land and, when launched, can be pivoted into the interior of the boat hull. Also disclosed are drawbars for attachment to the bow of the boat which enable the boat to be towed behind a motor vehicle.

20 Claims, 8 Drawing Figures

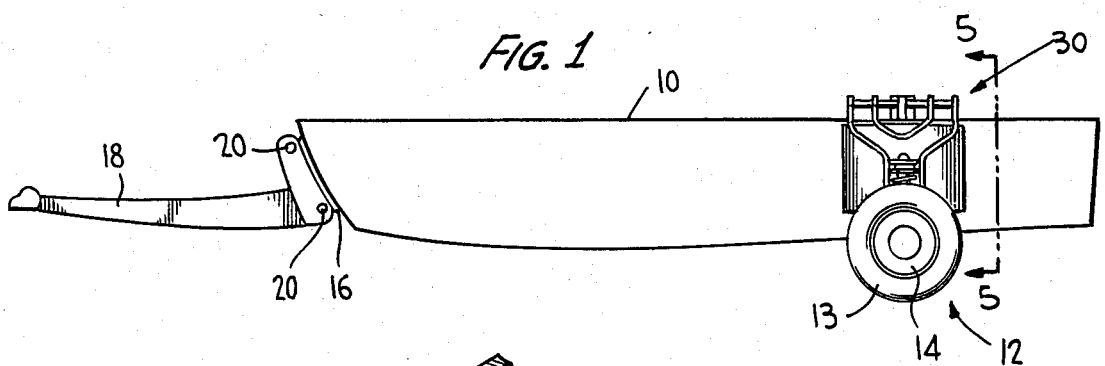
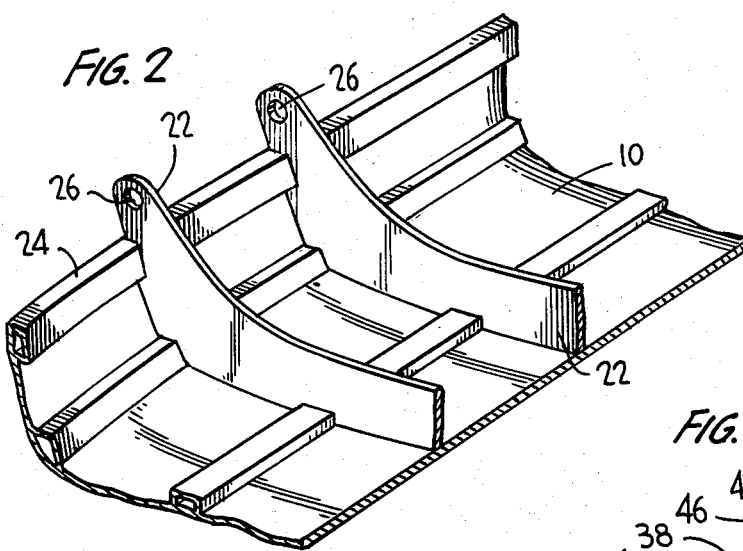

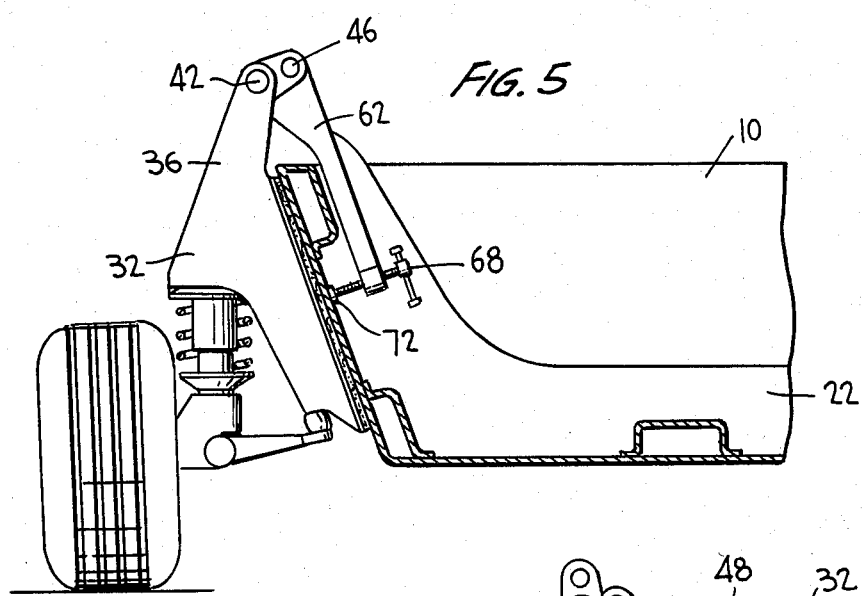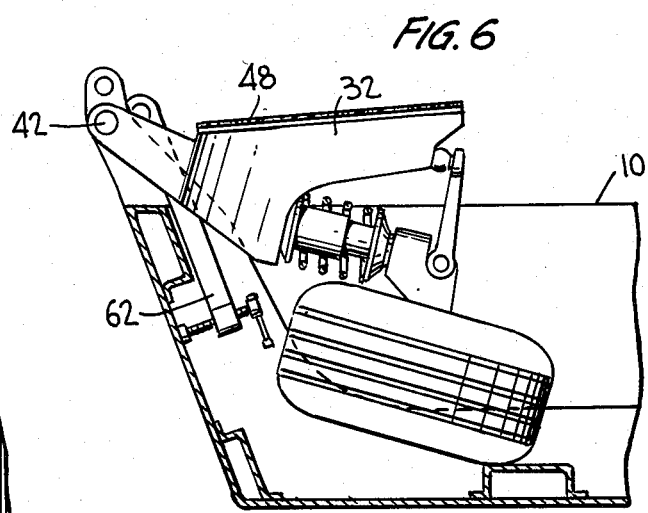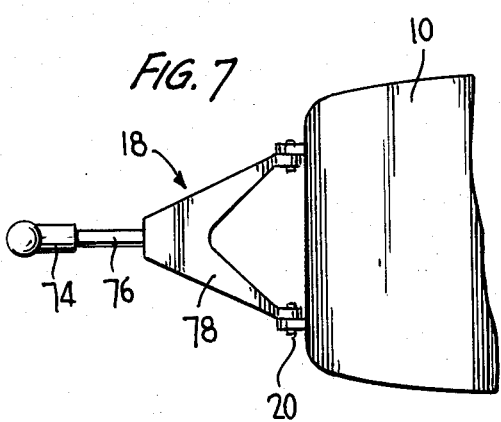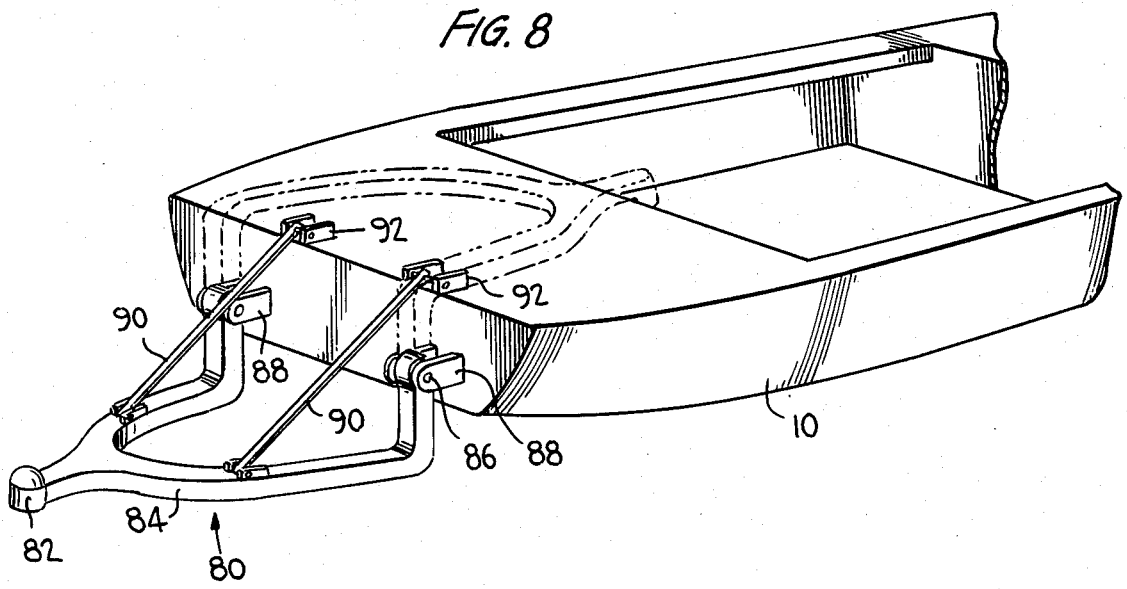

WHEEL SUPPORT ASSEMBLY FOR A BOAT

BACKGROUND OF THE INVENTION

The present invention relates to apparatus for the land transportation of small boats and, more particularly, to wheel support assemblies for small boats which allow the boat to be towed on land behind a motor vehicle and which are capable of being easily stowed aboard the boat when the boat is in the water.

As is well known, the conventional apparatus for transporting small boats on land is a boat trailer which comprises a boat support frame having two or more wheels and having an integral drawbar for attachment to a trailer hitch on a motor vehicle. Among the numerous inconveniences that are encountered with the use of such a conventional boat trailer is that, once the boat is launched, the trailer must be parked in a suitable location. At many boat launching facilities, parking space for boat trailers is minimal or is located a considerable distance from the launching site. In addition, parking a boat trailer often times involves backing the trailer into a parking space and many drivers experience difficulties in handling such a task.

Attempts to solve these inconveniences have included boat trailering apparatus which comprise supports having wheels which are attached directly to the side of the boat hull for land transportation and which are removable from the hull once the boat is launched. Examples of such apparatus may be found in U.S. Pat. No. 2,909,378 to Borchers; U.S. Pat. No. 2,632,655 to King et al; and U.S. Pat. No. 3,612,566 to Sholl. The Borchers patent discloses detachable running gear for small boats which includes a track plate permanently secured to the bottom of the boat and a sliding plate having a transverse axle detachably secured to the track plate. The King patent discloses a boat carrying apparatus comprising an angle plate permanently attached to the side of the boat hull and a frame hooked to the angle plate and detachably engaged to the gunnel of the boat, the frame carrying an axle and suspension means in the form of a spring. The Sholl patent describes a removable support wheel assembly for a boat which includes a mounting plate which is secured to the side of the boat and which has a pair of laterally spaced upstanding sleeves, and an inverted U-shaped bridge carrying an axle which has upstanding mounting pins which are removable in the sleeves of the mounting plate.

While the use of the above described apparatus eliminates some of the inconveniences associated with the use of a conventional boat trailer, e.g., the inconvenience of maneuvering, and parking an empty trailer once the boat is launched, a user must still locate a suitable location to safely store the wheel support portion of the apparatus while using the boat. In addition, the user has the inconvenience of removing the wheel support from the boat and transporting them to the storage location. Also, the reattachment of the wheel supports while the boat is still in the water involves the user entering the water while carrying the supports and attempting to secure the supports to the hull while the supports are at least partially submerged. If reattachment is conducted on land, the boat must be carried out of the water or other arrangements made to lift the boat from the water which generally defeats one of the major advantages over using a trailer. Furthermore, apparatus of this type generally include some form of mounting means which is permanently secured to the exterior of the boat hull at or below the normal waterline of the boat. Such mounting means would therefore disturb the flow of water as the boat is propelled and would thus contribute significant drag in the progress of the boat through the water.

SUMMARY OF THE INVENTION

Accordingly, it is a feature of the present invention to provide a wheel support assembly which is adapted to be used in pairs so as to support a boat as a wheeled structure which may be readily towed behind a motor vehicle.

It is a further feature of the present invention to provide a wheel support assembly for a small boat which can be easily stored within the interior of the boat, particularly when the boat is in the water.

It is another feature of the present invention to provide a wheel support assembly for a boat which does not disturb the exterior contour of the hull of the boat when the wheel support assembly is stored within the boat.

It is yet another feature of the present invention to provide a wheel support assembly for a boat which can be easily positioned for the land transportation of a boat.

Briefly, the present invention comprehends a wheel support assembly adapted for use in transporting a boat, the assembly comprising a wheel support including a frame and suspension means attached to the frame which includes an axle, said frame including at least two arms extending therefrom, each arm having at least two apertures therein, the apertures of one arm being axially aligned with the apertures of the other arm; a locking member comprising an elongated bar having, at one end, two guides having axially parallel bores, the axes of the bores being spaced from each other the same distance as the axes of the two apertures in the arm are spaced from each other, the elongated bar having clamping means at the other end; a pivot rod adapted to pass through one bore of said guides and an aperture in each arm; and a locking bar adapted to pass through the other of said guides and an aperture in each arm.

Further objects, advantages and features of the present invention will become more fully apparent from a detailed consideration of the arrangement and construction of the constituent parts as set forth in the following description taken together with the accompanying drawing.

BRIEF DESCRIPTION OF THE DRAWINGS

In the drawings,

FIG. 1 is a side elevational view of a boat adapted for towing behind a motor vehicle which has a wheel support assembly according to the present invention, FIG. 2 is a perspective view of a portion of the interior of a boat illustrating the ribs used for attachment to the wheel support assembly of the invention, to the boat, FIG. 3 is a perspective view of the wheel support of the wheel support assembly, FIG. 4 is a perspective view of the locking member of the wheel support assembly, FIG. 5 is a cross-sectional view taken along line 5—5 in FIG. 1, the nearest rib having been excluded for clarity, showing the wheel support assembly in an operative position for land transportation of the boat, FIG. 6 is a cross-sectional view similar to that of FIG. 5 showing the wheel support assembly stored within the boat, FIG. 7 is a top view of the drawbar shown in FIG. 1, and FIG. 8 is a perspective view of another embodiment of a drawbar shown attached to the bow of a boat.

DETAILED DESCRIPTION OF THE PREFERRED EMBODIMENTS

Referring now to FIG. 1, shown is boat 10 of a conventional type having wheel support assembly 30 in accordance with the present invention. Two identical assemblies 30 are provided, one on either side of boat 10 preferably positioned nearer to the stern than the bow. Each wheel support assembly 30 carries conventional wheel 12 comprising pneumatic tire 13 mounted on rim 14. Fixed to the bow of boat 10 are two vertically extending planar brackets 16, only one being shown, to which drawbar 18 is demountably attached by bolts 20. Drawbar 18 is adapted to be attached to a conventional trailer hitch mounted on a motor vehicle (not shown). As is apparent, drawbar 18 and wheel support assembly 30 allow boat 10 to be transported over land without the necessity of a conventional boat trailer and, as will be apparent from the following description, enable the boat to be launched and taken back out of the water without the incovenience inherent in maneuvering and parking an unloaded conventional boat trailer.

The construction of wheel support assembly 30 and the manner in which it is attached to boat 10 are shown in FIGS. 2-4. FIG. 2 illustrates a portion of the interior of boat 10 where modified ribs 22 each extend upwardly over gunnel 24 and each has circular aperture 26 which is axially aligned with the other aperture. Apertures 26 in ribs 22 provide points of attachment for wheel support assembly 30 and also provide a pivot axis which allows the wheel support to be swung into the interior of boat 10.

FIG. 3 is a perspective view of wheel support 32 forming a part of wheel support assembly 30 shown on the side of boat 10, the wheel support adapted to rotatably carry a conventional tire and rim (not shown). Wheel support 32 comprises frame 34 including two parallel extending exterior arms 36 and two parallel extending interior arms 38. Each exterior arm 36 is connected to one interior arm by cylinder 40, the cylinders being aligned axially to each other. Pivot rod 42 extends through cylinders 40 and axial apertures 44 in arms 36 and 38, the rod being secured in position by lock pins 45 extending through a hole in each end of the rod. The outward ends of interior arms 38 are further provided with axially aligned apertures 47 such that when lock rod 46 extends therethrough, the longitudinal axis of the lock rod is parallel with the longitudinal axis of pivot rod 42. Lock rod 46 is also secured in place by means of lock pins 45. Bearing plate 48, which forms a part of frame 34, is adapted to contact the side of boat 10 and is at least partially covered with a layer 49 of resilient material such as rubber to help prevent surface damage to the exterior side of the boat hull.

Suspension means 50 carried by frame 34 may be of any conventional type for dampening and absorbing shocks produced during road travel. In the embodiment shown, suspension means 50 comprises a McPherson type strut secured at its upper end to outwardly extending ears 52 of frame 34. The lower end of suspension means 50 includes axle spindle 54 adapted to rotatably support a conventional tire and rim (not shown) and two axially aligned projections 56. A-shaped mount 58 is attached to frame 34 by ball joint 59 and pivotably attached to projections 56.

Wheel support assembly 30 also includes locking member 60 as is shown in FIG. 4. Locking member 60 comprises an elongated bar 62 having two axially parallel guides 64 and 66 at one end. The bore of guide 64 is of a diameter such that pivot rod 42 can pass therethrough with a snug fit and the bore of guide 66 is of a diameter such that lock rod 46 can pass therethrough with a close fit. The axes of guides 64 and 66 are spaced from one another the same distance as the axes of cylinders 40 and apertures 47 in arm 38 for lock rod 46 are spaced from each other. Thus, locking member 60 can be fixedly secured to wheel support 32 by placing guides 64 and 66 between interior arms 38 and passing pivot rod 42 and lock rod 46 through the apertures in arms 36 and 38 and through the bore of the guides. At the other end of elongated bar 62, screw clamp 68 having handle 70 and floating enlarged head 72 extends through a threaded bore in the elongated bar.

The attachment of wheel support assembly 30 to the side of boat 10 is illustrated in FIG. 5 which is a view taken along line 5—5 of FIG. 1 with rib 22 nearest the stern not being shown for purposes of clarity. To attach wheel support assembly 30, pivot rod 42 and lock rod 46 are removed from wheel support 32 and the ends of exterior arms 36 are placed adjacent to aperture 26 in ribs 22 of boat 10. Guides 64 and 66 of lock member 60 are then placed between interior arms 38 of wheel support 32 and pivot rod 42 inserted through guide 64 and apertures in the arms 36 and 38. Lock rod 46 is then inserted through guide 66 and aperture 47 in interior arms 38. Attachment is completed by rotating screw clamp 68 until enlarged head 72 contacts the interior side of the boat hull.

Once boat 10 is launched, wheel support assembly 30 need not be removed from the boat but can be stored in the interior of the boat by simply removing lock rod 46 and pivoting wheel support 32 about pivot rod 42 to a storage position as is shown in FIG. 6. Once pivoted to the storage position, bearing plates 48 of frame 34 can be used as seats. When it desired to remove boat 10 from the water, wheel supports 32 are pivoted to their exterior position and lock rod 46 reinserted as shown in FIG. 5. Consequently, wheel support assemblies 30 can be easily placed in their operative position for land travel while boat 10 is still in the water without the user having to enter the water.

In FIG. 7, shown in a top view of drawbar 18 illustrated in FIG. 1. Drawbar 18 comprises hitch portion 74 adapted to be attached to a conventional vehicle mounted, ball type trailer hitch (not shown), shaft portion 76 and arcuate yoke portion 78 adapted to be attached to brackets 16 on the hull of boat 10 by bolts 20. When boat 10 is in water, drawbar 18 is detached from the boat and stored in a suitable location.

FIG. 8 illustrates another embodiment of a drawbar in accordance with the present invention. Drawbar 80, like drawbar 18, has hitch portion 82 and yoke portion 84 adapted to be attached to a boat hull. Yoke portion 84, however, is pivotally attached to the hull by pivot pins 86 passing through mounts 88 and the apertured ends of the yoke portion. Drawbar 80 is further provided with stabilizing rods 90 releasably attached to the hull of boat 10 at apertured supports 92 and at the center of yoke portion 84.

As is apparent, with stabilizing rods 90 in place, drawbar 80 can be used for towing boat 10. Once boat 10 is launched, stabilizing rods 90 can be released and drawbar 80 pivoted over the bow of boat 10 as is shown by the dashed lines. The use of drawbar 80 is advantageous since its construction is more suitable for heavier boats. In addition, since drawbar 80 can simply be pivoted onto the bow of boat 10, there is no necessity to detach the drawbar and provide storage for it when the boat is in the water.

As is apparent from the foregoing, use of the wheel support assembly of the invention eliminates at least some, if not all, of the inconveniences associated with the use of a conventional boat trailer. In addition, the invention offers significant advantages over the known removable wheeled apparatus as described previously in that the wheel support assembly of the invention need not be stored on land while the boat is being used and its use eliminates the necessity to retrieve the wheeled apparatus when the boat is to be towed from the water. The subject wheel support assembly can also be maneuvered into its operative position while the boat is in water without the necessity of the user to enter the water. Furthermore, the use of the present invention does not alter the external contour of the boat hull, and thus creates no drag as the boat moves through the water.

While the present invention has been described with reference to particular embodiments thereof, it will be understood that numerous modifications may be made by those skilled in the art without actually departing from the spirit and scope of the invention as defined in the appended claims.

What is claimed is:

1. A wheel support assembly adapted for use in transporting a boat, the assembly comprising a wheel support including a frame, and suspension means attached to the frame which includes an axle, said frame including at least two extending arms, each arm having at least two apertures therein, the apertures of one arm being axially aligned with the apertures of the other arm, the frame further including two additional arms having at least one aperture therein axially aligned with an aperture in each of the extending arms; a locking member comprising an elongated bar having, at one end, two guides having axially parallel bores, the axes of the bores being spaced from each other the same distance as the axes of the two apertures in each arm are spaced from each other, the elongated bar having clamping means at the other end; a pivot rod adapted to pass through one bore of said guides and through an aperture in each arm; and a lock rod adapted to pass through the bore of the other of said guides and through an aperture in each arm.

2. A wheel support assembly in accordance with claim 1 wherein the frame includes a bearing plate.

3. A wheel support assembly in accordance with claim 2 wherein the bearing plate is at least partially covered with a layer of resilient material.

4. A wheel support assembly in accordance with claim 1 wherein the extending arms extend parallel to each other.

5. A wheel support assembly in accordance with claim 1 wherein the suspension means comprises a McPherson type strut.

6. A wheel assembly in accordance with claim 1 wherein the clamp means comprises a threaded rod extending through a threaded aperture in the locking member.

7. A wheel support assembly in accordance with claim 1 wherein a cylinder extends between at least two of the aligned apertures in the extending arms.

8. A boat comprising a hull having gunnels and at least two apertured ribs on each side of the boat which extend above the gunnels, the apertures being axially aligned with each other and two wheel support assemblies, each of said wheel support assemblies comprising a wheel support including a frame contacting the exterior of the hull, and suspension means attached to the frame which includes an axle, said frame having at least two extending arms, each arm having at least two apertures therein, the apertures of one arm being axially aligned with the apertures of the other arm; a locking member comprising an elongated bar having, at one end, two guides having axially parallel bores, the axes of the bores being spaced from each other the same distance as the axes of the two apertures in each extending arm are spaced from each other, the elongated bar having clamping means at the other end adapted to engage the interior of the hull; a pivot rod passing through one of said guides, an aperture in each arm, and the apertures of the ribs; and a locking rod passing through the bore of the other of said guides and an aperture in each arm.

9. A boat in accordance with claim 8 wherein the frame includes two additional arms each having at least one aperture therein axially aligned with an aperture in each of the extending arms, the pivot rod passing through the apertures in the additional arms.

10. A boat in accordance with claim 8 wherein the frame includes a bearing plate contacting the exterior of the hull.

11. A boat in accordance with claim 10 wherein the bearing plate is at least partially covered with a layer of resilient material.

12. A boat in accordance with claim 8 wherein the extending arms extend parallel to each other.

13. A boat in accordance with claim 9 wherein the bearing plate is at least partially covered with a layer of resilient material.

14. A boat in accordance with claim 8 wherein the suspension means comprises a McPherson type strut.

15. A boat in accordance with claim 8 wherein the clamp means comprises a threaded rod extending through a threaded aperture in the locking member.

16. A boat in accordance with claim 9 wherein a cylinder extends between at least two of the aligned apertures in the extending arms.

17. A boat in accordance with claim 8 further including a drawbar releasably attached to the bow of boat.

18. A wheel support assembly adapted for use in transporting a boat, the assembly comprising a wheel support including a frame which includes a bearing plate which is at least partially covered with a layer of resilient material, and suspension means attached to the frame which includes an axle, said frame including at least two extending arms, each arm having at least two apertures therein, the apertures of one arm being axially aligned with the apertures of the other arm; a locking member comprising an elongated bar having, at one end, two guides having axially parallel bores, the axes of the bores being spaced from each other the same distance as the axes of the two apertures in each arm are spaced from each other, the elongated bar having clamping means at the other end; a pivot rod adapted to pass through one bore of said guides and through an aperture in each arm; and a lock rod adapted to pass through the bore of the other of said guides and through an aperture in each arm.

19. A wheel support assembly in accordance with claim 18, wherein the suspension means comprises a McPherson type strut.

20. A wheel support assembly in accordance with claim 18, wherein the clamp means comprises a threaded rod extending through a threaded aperture in the locking member.

* * * * *